(12) United States Patent
Abelli

(10) Patent No.: US 10,836,416 B1
(45) Date of Patent: Nov. 17, 2020

(54) CHIMINEA CART APPARATUS

(71) Applicant: Dino Abelli, Leland, NC (US)

(72) Inventor: Dino Abelli, Leland, NC (US)

( * ) Notice: Subject to any disclaimer, the term of this patent is extended or adjusted under 35 U.S.C. 154(b) by 0 days.

(21) Appl. No.: 16/546,854

(22) Filed: Aug. 21, 2019

(51) Int. Cl.
*B62B 3/02* (2006.01)
*B62B 1/26* (2006.01)
*B62B 1/00* (2006.01)
*B62B 1/10* (2006.01)
*B62B 5/06* (2006.01)

(52) U.S. Cl.
CPC ............... *B62B 1/26* (2013.01); *B62B 1/008* (2013.01); *B62B 1/10* (2013.01); *B62B 5/06* (2013.01); *B62B 2202/02* (2013.01); *B62B 2301/04* (2013.01); *B62B 2501/067* (2013.01)

(58) Field of Classification Search
CPC .. B62B 1/26; B62B 1/008; B62B 1/10; B62B 5/06
See application file for complete search history.

(56) References Cited

U.S. PATENT DOCUMENTS

| | | | | |
|---|---|---|---|---|
| 879,914 | A | | 2/1908 | Schriver |
| 1,438,334 | A * | 12/1922 | Sabin | ...................... B62B 1/264 414/457 |
| 1,873,690 | A * | 8/1932 | Ward | ...................... B62B 1/264 414/453 |
| 2,078,119 | A | | 4/1937 | Benedict |
| 2,197,587 | A * | 4/1940 | Miller | ...................... B62B 1/264 414/449 |
| 2,472,670 | A * | 6/1949 | McFarland | ............. B62B 1/264 414/457 |
| 2,818,271 | A | | 12/1957 | Saeli |
| D197,767 | S | | 3/1964 | Land |
| D201,749 | S | | 7/1965 | Rolland |
| 3,377,081 | A * | 4/1968 | Ude | ......................... B62B 1/10 280/47.27 |
| 3,845,968 | A * | 11/1974 | Larson | .................... B62B 1/264 280/654 |
| 4,050,708 | A * | 9/1977 | Samardzija | ............... B62B 1/14 280/47.26 |
| D335,737 | S | | 5/1993 | Bell, Sr. |
| 6,053,516 | A * | 4/2000 | Ottaway | ................. B62B 1/264 280/47.24 |
| 6,099,020 | A * | 8/2000 | Liao | ........................ B62B 1/042 188/5 |
| 6,334,622 | B1 | | 1/2002 | Romero |
| D463,649 | S | | 9/2002 | Halstead |
| 2013/0094928 | A1 | | 4/2013 | McFarland |
| 2015/0035259 | A1* | 2/2015 | Umbro | ...................... B62B 1/12 280/654 |

* cited by examiner

*Primary Examiner* — John D Walters
*Assistant Examiner* — James J Triggs

(57) ABSTRACT

A chiminea cart apparatus for moving chimineas includes a base ring. A handle has a pair of arms extending from a base top side and a grip portion joining the pair of arms. Each of the pair of arms has a curved portion proximal the base ring and a straight portion extending from the curved portion to the grip portion. The curved portion is configured to accommodate a bulbous portion of a chiminea. A set of legs comprises a pair of back legs coupled to a base bottom side proximal the handle and a front leg coupled to the base bottom side opposite the handle. A pair of wheels is coupled to the pair of back legs and a support is coupled to the front leg.

11 Claims, 4 Drawing Sheets

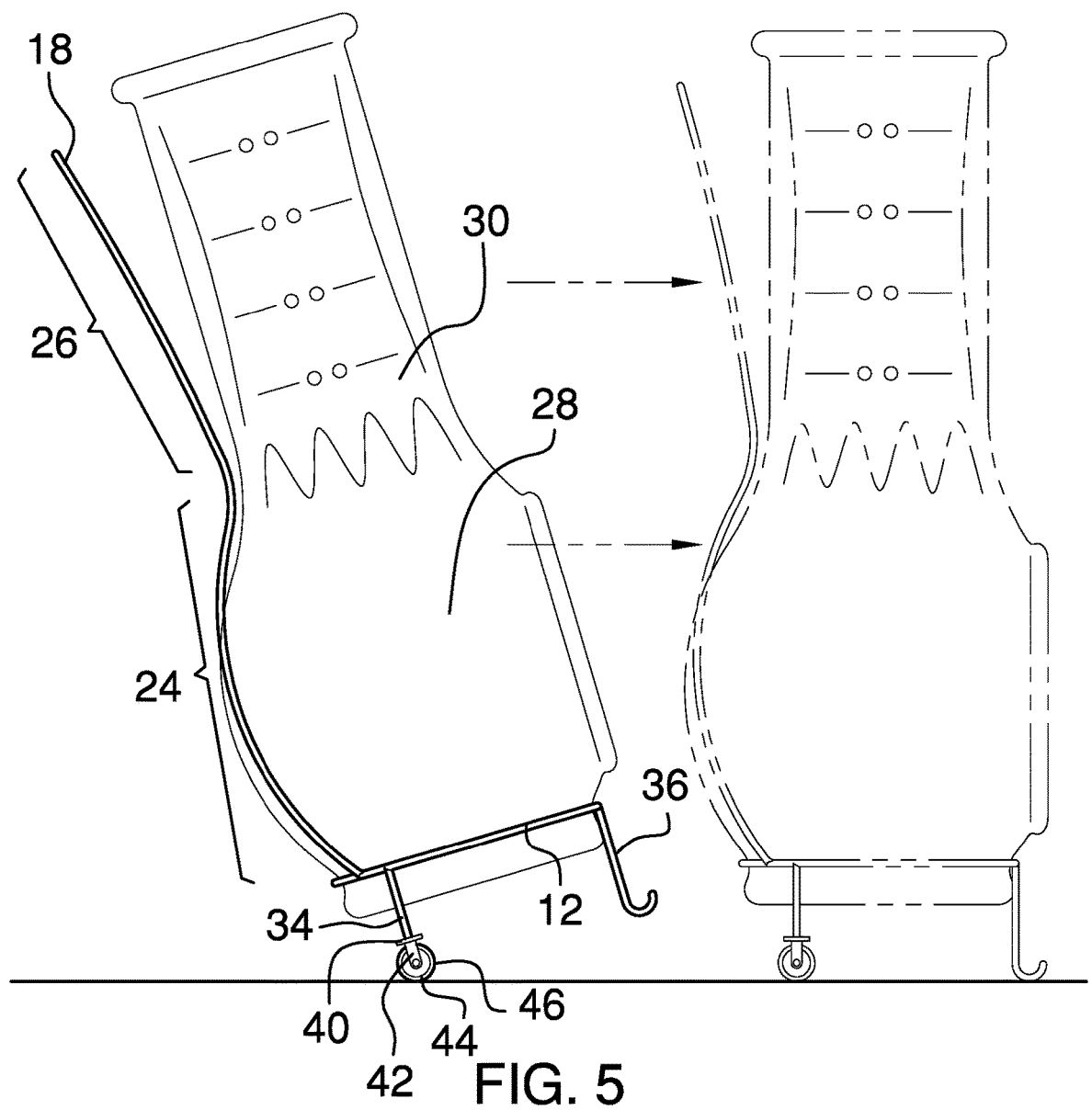

CHIMINEA CART APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to cart devices and more particularly pertains to a new cart device for moving chimineas.

(2) Description of Related Art Including Information Disclosed Under 37 CFR 1.97 and 1.98

The prior art relates to cart devices.

BRIEF SUMMARY OF THE INVENTION

An embodiment of the disclosure meets the needs presented above by generally comprising a base ring having a base top side and a base bottom side. A handle is coupled to the base ring and has a pair of arms extending from the base top side and a grip portion joining the pair of arms. Each of the pair of arms has a curved portion proximal the base ring and a straight portion extending from the curved portion to the grip portion. The curved portion is configured to accommodate a bulbous portion of a chiminea. A set of legs is coupled to the base ring and comprises a pair of back legs coupled to the base bottom side proximal the handle and a front leg coupled to the base bottom side opposite the handle. A pair of wheels is coupled to the pair of back legs and a support is coupled to the front leg. A height of the support is equal to a height of each wheel such that the base ring rests horizontally when each of the pair of wheels and the support contact level ground.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 5 is an in-use view of an embodiment of the disclosure.

DETAILED DESCRIPTION OF THE INVENTION

Figure 1:
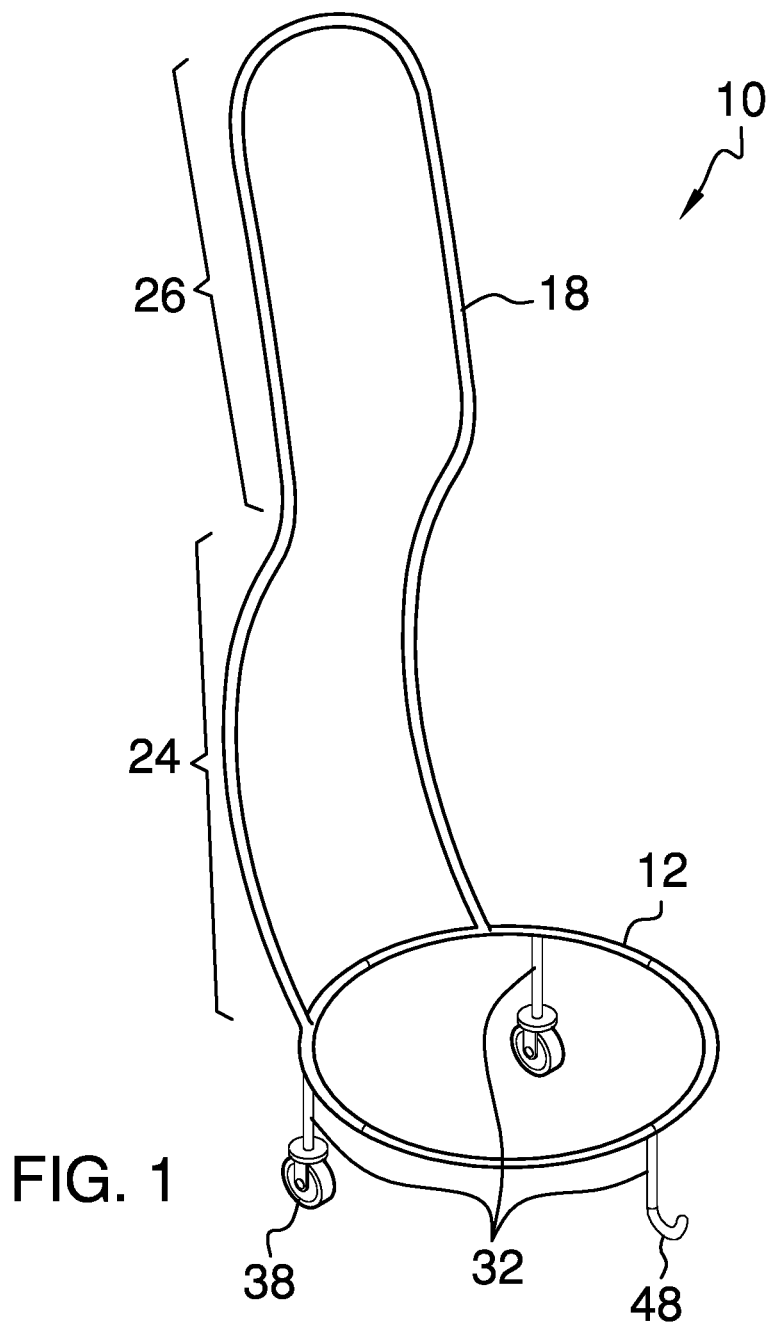
FIG. 1 is an isometric view of a chiminea cart apparatus according to an embodiment of the disclosure.
Figure 2:
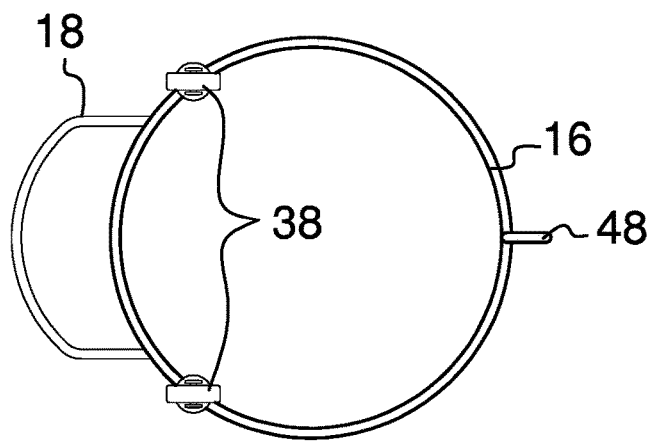
FIG. 2 is a bottom plan view of an embodiment of the disclosure.
Figure 3:
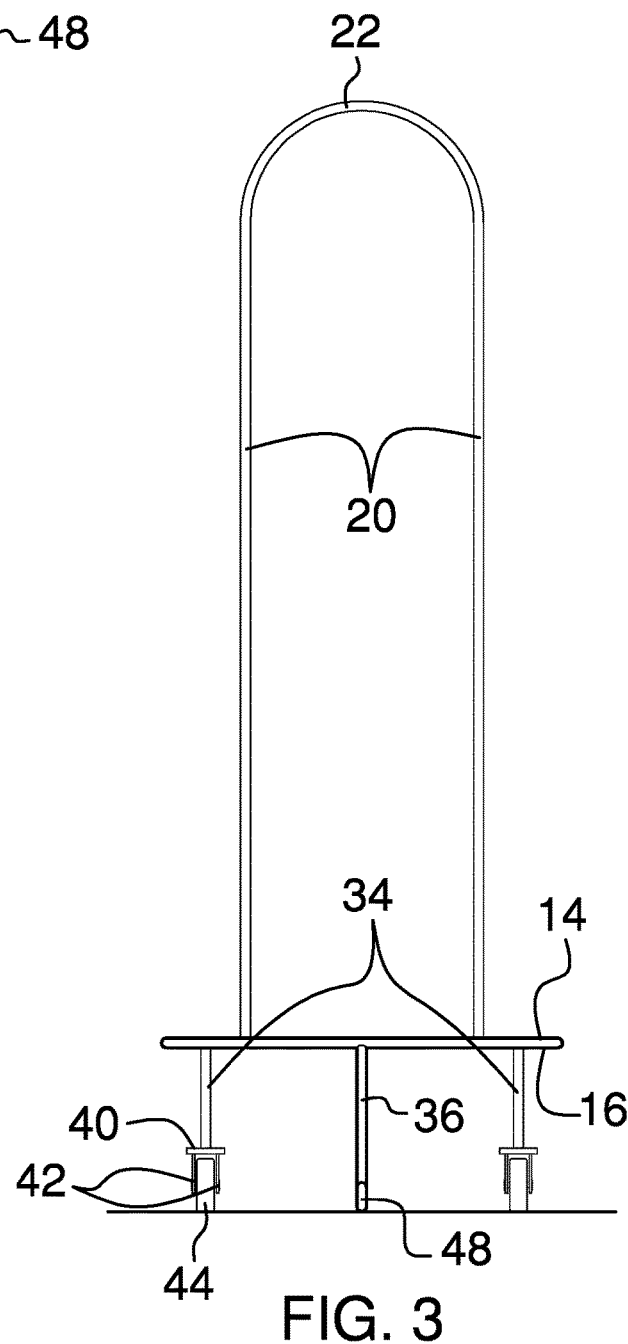
FIG. 3 is a front elevation view of an embodiment of the disclosure.
Figure 4:
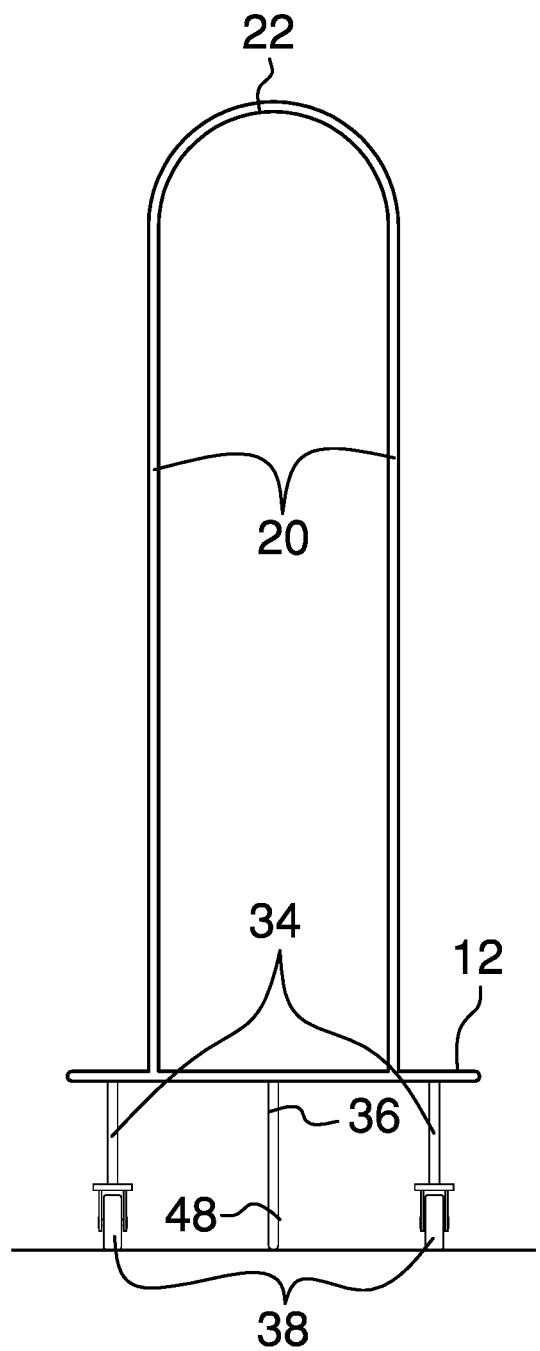
FIG. 4 is a rear elevation view of an embodiment of the disclosure.

With reference now to the drawings, and in particular to FIGS. 1 through 5 thereof, a new cart device embodying the principles and concepts of an embodiment of the disclosure and generally designated by the reference numeral 10 will be described.

As best illustrated in FIGS. 1 through 5, the chiminea cart apparatus 10 generally comprises a circular base ring 12 having a base top side 14 and a base bottom side 16. A handle 18 is coupled to the base ring 12. The handle 18 has a pair of parallel arms 20 extending from the base top side 14 and a grip portion 22 joining the pair of arms 20. Each of the pair of arms 20 has a curved portion 24 proximal the base ring 12 and a straight portion 26 extending from the curved portion 24 to the grip portion 22. The grip portion 22 is rounded and forms an inverted U-shape with the straight portion 26 of each arm. The handle 18 extends to an ergonomic height for an adult to manipulate the grip portion 22. The curved portion 24 is configured to accommodate a bulbous portion 28 of a chiminea 30.

A set of legs 32 is coupled to the base ring 12. The set of legs 32 comprising a pair of back legs 34 coupled to the base bottom side 16 on either side of the handle 18 and a front leg 36 coupled to the base bottom side 16 opposite the handle 18. The set of legs 32 may be evenly distributed 120° apart around the base ring 12. A pair of wheels 38 is coupled to the pair of back legs 34. Each wheel 38 may have a circular swivel 40 coupled to the back leg 34, a pair of forks 42 extending from the circular swivel 40, and a tire 44 coupled between the pair of forks 42. The tire 44 may have a rubberized tread 46. A support 48 is coupled to the front leg 36. The support 48 may be J-shaped and curves away from the base ring 12. A height of the support 48 is equal to a height of each wheel 38 such that the base ring 12 rests horizontally when each of the pair of wheels 38 and the support 48 contact level ground.

In use, the chiminea 30 is placed on the base ring 12 and the handle 18 is secured to tilt the apparatus 10 onto the rear wheels 38 with the support 48 lifted off the ground. The chiminea 30 may then be moved to a desired location and lifted off the base ring 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A chiminea cart apparatus comprising:
a base ring, the base ring having a base top side and a base bottom side;
a handle coupled to the base ring, the handle having a pair of arms extending from the base top side and a grip portion joining the pair of arms, each of the pair of arms having a curved portion proximal the base ring and a straight portion extending from the curved portion to the grip portion, the curved portion being configured to accommodate a bulbous portion of a chiminea;
a set of legs coupled to the base ring, the set of legs comprising a pair of back legs coupled to the base bottom side proximal the handle and a front leg coupled to the base bottom side opposite the handle;
a pair of wheels coupled to the pair of back legs; and
a support coupled to the front leg, a height of the support being equal to a height of each wheel such that the base ring rests horizontally when each of the pair of wheels and the support contact level ground.

2. The chiminea cart apparatus of claim 1 further comprising the base ring being circular.

3. The chiminea cart apparatus of claim 2 further comprising the set of legs being evenly distributed 120° apart around the base ring.

4. The chiminea cart apparatus of claim 1 further comprising the handle being coupled between the pair of back legs.

5. The chiminea cart apparatus of claim 1 further comprising the pair of arms being parallel.

6. The chiminea cart apparatus of claim 5 further comprising the grip portion being rounded and forming an inverted U-shape with the straight portion of each arm.

7. The chiminea cart apparatus of claim 1 further comprising the support being J-shaped and curving away from the base ring.

8. The chiminea cart apparatus of claim 1 further comprising each wheel having a circular swivel coupled to the back leg, a pair of forks extending from the circular swivel, and a tire coupled between the pair of forks.

9. The chiminea cart apparatus of claim 1 further comprising the tire having a rubberized tread.

10. A chiminea cart apparatus comprising:
a base ring, the base ring being circular and having a base top side and a base bottom side;
a handle coupled to the base ring, the handle having a pair of parallel arms extending from the base top side and a grip portion joining the pair of arms, each of the pair of arms having a curved portion proximal the base ring and a straight portion extending from the curved portion to the grip portion, the grip portion being rounded and forming an inverted U-shape with the straight portion of each arm, the curved portion being configured to accommodate a bulbous portion of a chiminea;
a set of legs coupled to the base ring, the set of legs comprising a pair of back legs coupled to the base bottom side proximal the handle and a front leg coupled to the base bottom side opposite the handle, the set of legs being evenly distributed 120° apart around the base ring;
a pair of wheels coupled to the pair of back legs, each wheel having a circular swivel coupled to the back leg, a pair of forks extending from the circular swivel, and a tire coupled between the pair of forks, the tire having a rubberized tread; and
a support coupled to the front leg, the support being J-shaped and curving away from the base ring, a height of the support being equal to a height of each wheel such that the base ring rests horizontally when each of the pair of wheels and the support contact level ground.

11. A chiminea cart apparatus and chiminea combination comprising:
a chiminea, the chiminea having a bulbous portion; and
a chiminea cart apparatus comprising:
a base ring, the base ring being circular and having a base top side and a base bottom side;
a handle coupled to the base ring, the handle having a pair of parallel arms extending from the base top side and a grip portion joining the pair of arms, each of the pair of arms having a curved portion proximal the base ring and a straight portion extending from the curved portion to the grip portion, the grip portion being rounded and forming an inverted U-shape with the straight portion of each arm, the curved portion accommodating the bulbous portion of the chiminea;
a set of legs coupled to the base ring, the set of legs comprising a pair of back legs coupled to the base bottom side proximal the handle and a front leg coupled to the base bottom side opposite the handle, the set of legs being evenly distributed 120° apart around the base ring;
a pair of wheels coupled to the pair of back legs, each wheel having a circular swivel coupled to the back leg, a pair of forks extending from the circular swivel, and a tire coupled between the pair of forks, the tire having a rubberized tread; and
a support coupled to the front leg, the support being J-shaped and curving away from the base ring, a height of the support being equal to a height of each wheel such that the base ring rests horizontally when each of the pair of wheels and the support contact level ground.

\* \* \* \* \*